Figure 1:
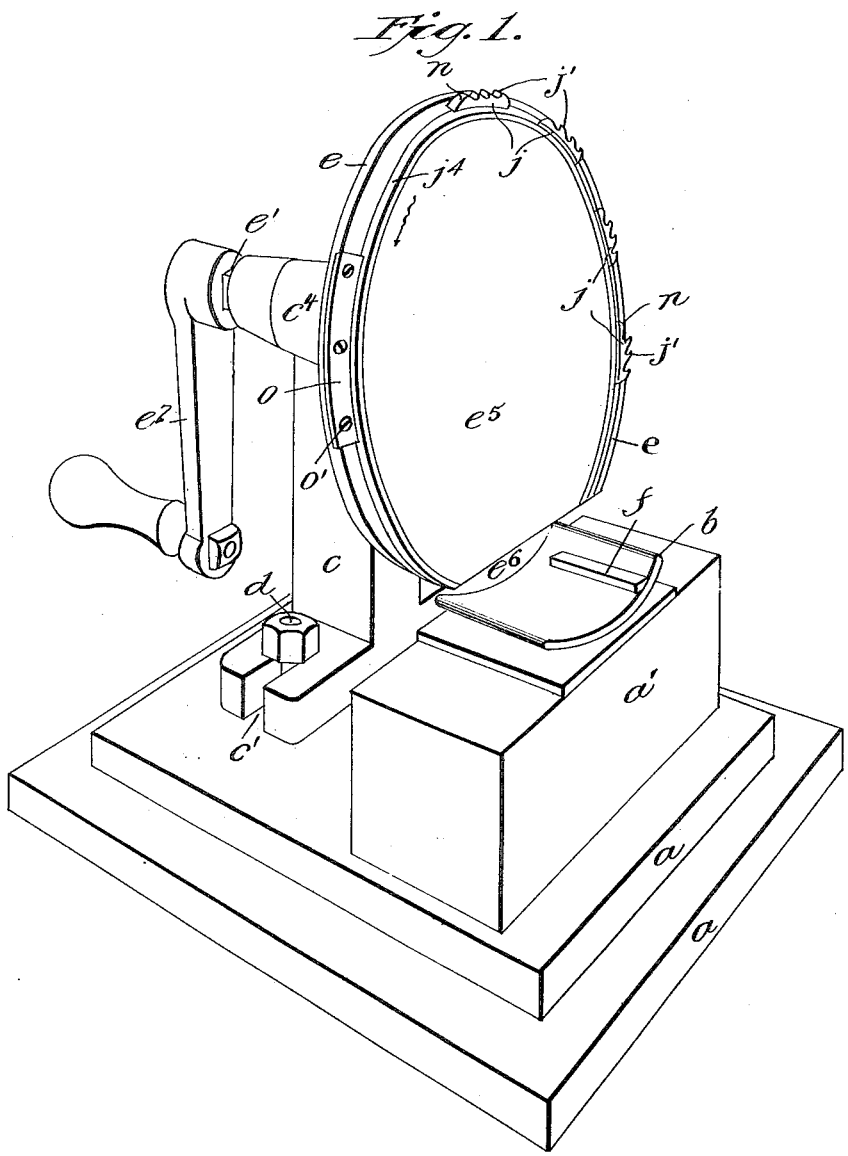

P. E. STOW.
FILM MENDING MACHINE.
APPLICATION FILED SEPT. 7, 1912.

1,088,478.

Patented Feb. 24, 1914.
4 SHEETS—SHEET 1.

Witnesses
T. L. Mordaunt
C. E. Parsons

Inventor
Percival Edwin Stow
By
Attorneys

P. E. STOW.
FILM MENDING MACHINE.
APPLICATION FILED SEPT. 7, 1912.

1,088,478.

Patented Feb. 24, 1914.

4 SHEETS—SHEET 2.

Witnesses
C E Parsons
R E Onrand

Inventor:
Percival Edwin Stow
By Spear Middleton,

P. E. STOW.
FILM MENDING MACHINE.
APPLICATION FILED SEPT. 7, 1912.

1,088,478.

Patented Feb. 24, 1914.
4 SHEETS—SHEET 3.

Witnesses
T. L. Mockabee
C E Parsons

Inventor
Percival Edwin Stow
By Spear, Middleton, Donaldson & Spear
Attorneys

P. E. STOW.
FILM MENDING MACHINE.
APPLICATION FILED SEPT. 7, 1912.

1,088,478.

Patented Feb. 24, 1914.
4 SHEETS—SHEET 4.

Attest
C. E. Parsons
N. E. Ourand

Inventor
Percival Edwin Stow
by
Spear Middleton, Donaldson & Spear
ATTYS.

UNITED STATES PATENT OFFICE.

PERCIVAL E. STOW, OF CROYDON, ENGLAND.

FILM-MENDING MACHINE.

1,088,478.

Specification of Letters Patent.

Patented Feb. 24, 1914.

Application filed September 7, 1912. Serial No. 719,213.

*To all whom it may concern:*

Be it known that I, PERCIVAL EDWIN STOW, subject of George V, King of Great Britain and Ireland, and resident of 61 Dingwall road, Croydon, in the county of Surrey, England, have invented a certain new and useful Film-Mending Machine, of which the following is a specification.

This invention is concerned with the preparation, and sometimes also the joining together subsequently of the ends of lengths of kinematograph films, and has for its chief object to expedite these operations. To this end, I prepare the films for joining, and, if desired, I also join them together, by means of a suitable machine. The machine may be constructed in various ways, but I find it preferable to so construct it that the film can be held stationary therein, and the required portion of the gelatin be removed therefrom by an abrading operation. Preferably, I provide a stop on the base of the machine, against which I place one edge of the film to be treated, and a springy or resilient plate which is arranged to bear on the end of the film under treatment so as to keep it stationary and prevent it buckling or bending during the abrading operation. The abraders for performing this operation are preferably carried by a rotary head provided on a spindle which is mounted in a bearing standing up from the base of the machine. This spindle is conveniently rotated by means of a handle. The abrading surfaces of the abraders are preferably placed at an angle with respect to the length of film, and may consist of sharpened edges each of which removes from the film a fine shaving of the gelatin. The abraders are preferably spring-controlled or yieldably mounted. A cutter, preferably of knife-form, is arranged in proximity to the abraders for the purpose of cutting back the film to the required length.

Machines constructed in accordance with this invention are illustrated in the accompanying drawings, wherein—

Figure 2:
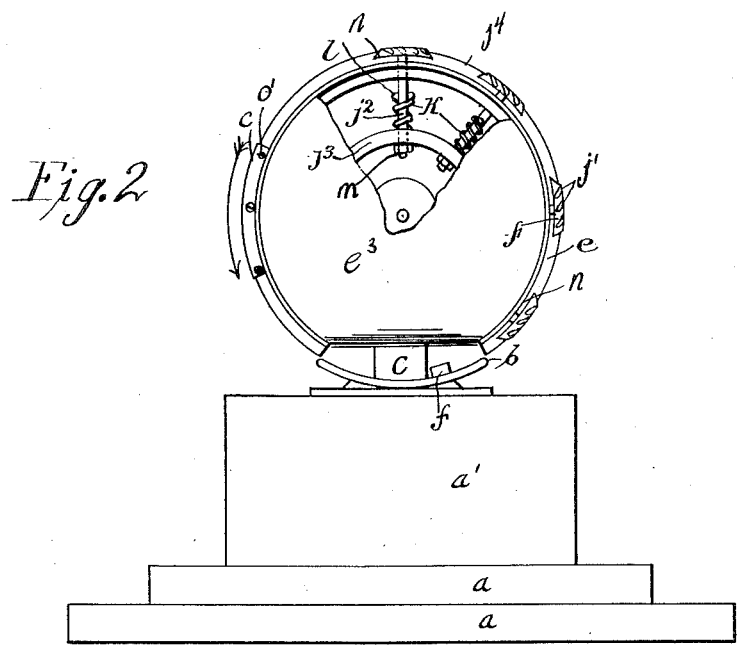
Figure 3:
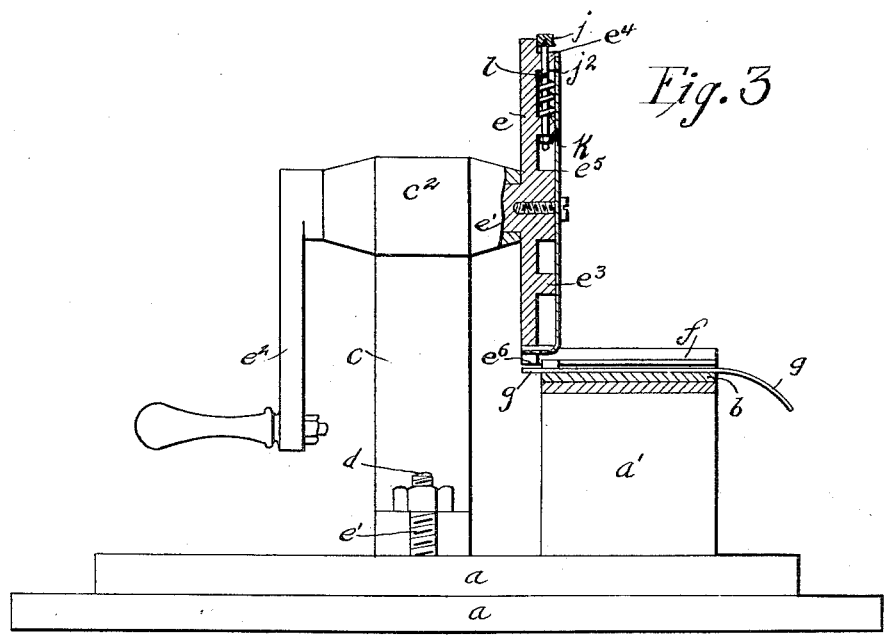
Figure 4:
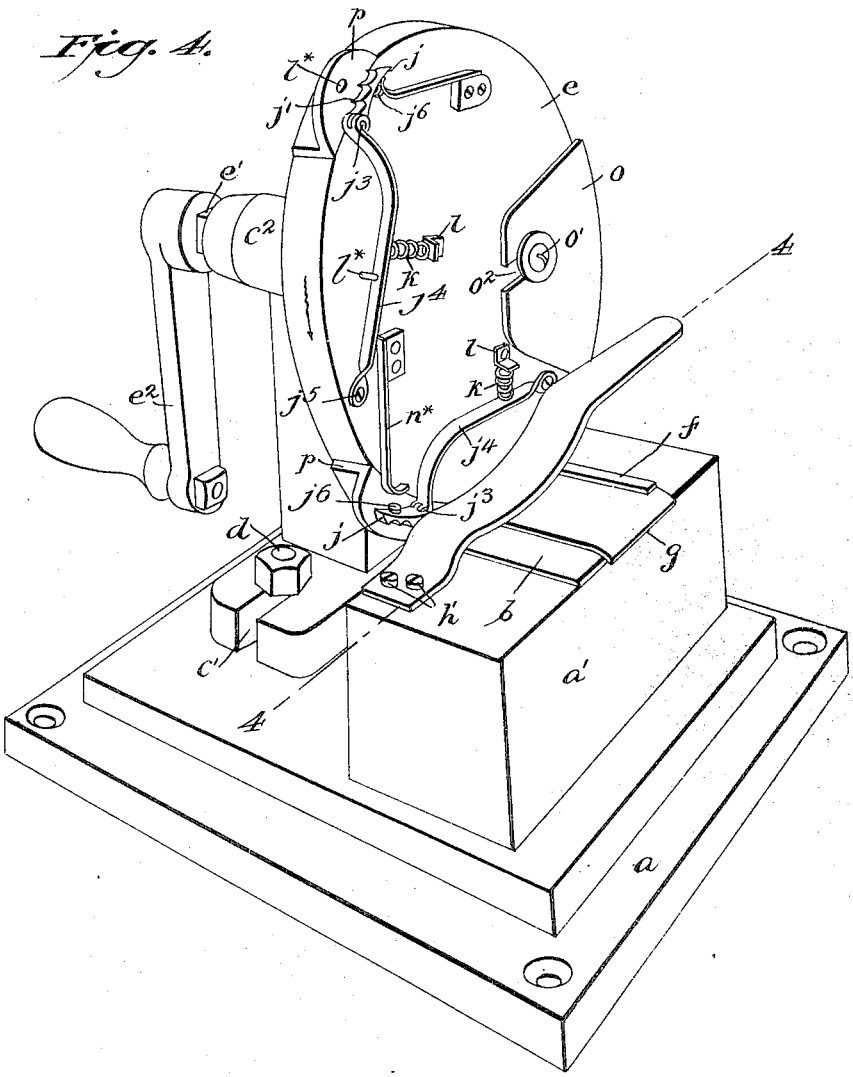
Figure 5:
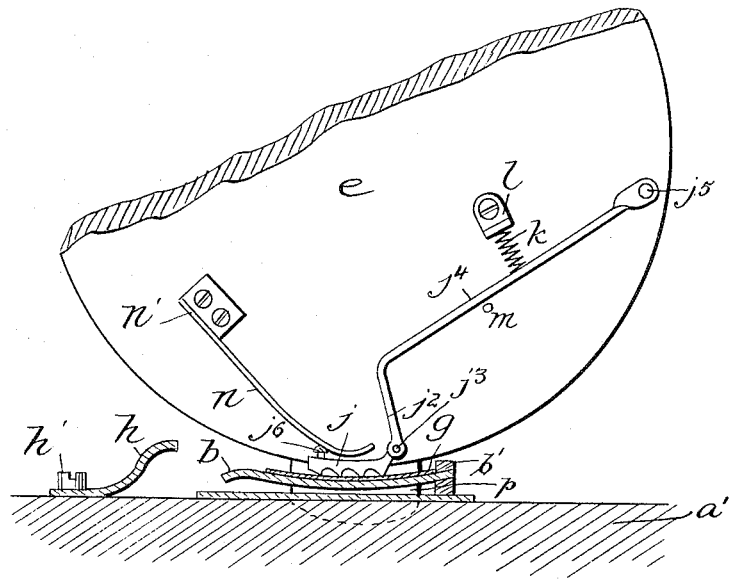
Figure 6:
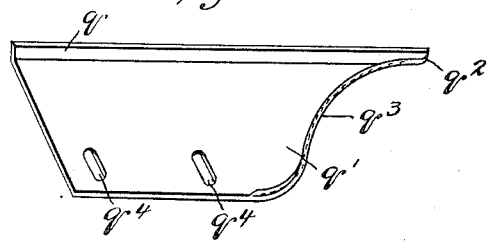

Figure 1 is a perspective view of one form of machine, and Figs. 2 and 3 are face views with a portion broken away, and elevation partly in section respectively of the same form of machine on a smaller scale. Fig. 4 is a perspective view of a machine with some modified details, and Fig. 5 is a part vertical section on a larger scale on line 4—4 of Fig. 4, showing also a portion of the rotary head, &c. Fig. 6 is a perspective view of a form of knife which I may use in removing the gelatin.

Referring to the drawings, $a$ is the base of the machine, $a'$ a table fixed thereon, and $b$ a cradle or platform of concave form and of greater width than the film to be treated. The cradle is suitably secured to the table. $c$ is a standard fixed to said base through the media of studs, of which one is shown at $d$, and slots, of which one is shown at $c'$, the slots being provided for the purpose of adjusting the position of the standard relatively to the cradle $b$. The cradle is curved throughout its length in the machine shown in Figs. 1, 2 and 3, but only at its inner end in the machine shown in Figs. 4 and 5, the curve being in the form of an arc of a circle whose center is coincident with the axis of rotation of the rotary head. The cradle may sometimes be provided with a small projection $b'$ adapted to enter one of the usual perforations which are found at the edges of the film. By these means, the film can be readily adjusted in position and also held stationary so that the width of the strip of gelatin removed from it is always the same, thereby enabling joints of uniform width to be made. Or, if said projections are not employed, the cradle may be whitened so as to show up the pictures on the film and thereby facilitate the operation of placing the film in correct position in the machine.

$e$ is the rotary head, the spindle $e'$ of which is supported in a bearing $c^2$ in the top of the standard $c$. The spindle is rotated in the direction of the arrow by means of the handle $e^2$.

On the cradle $b$ is fixed a stop $f$ against which is placed one edge of the film, shown at $g$ in Figs. 3 and 5.

The abraders $j$, $j$ are provided with abrading edges or surfaces in the form of teeth $j'$, $j'$, the teeth of consecutive abraders being disposed along lines which if produced would intersect one another, so as to insure that any gelatin that may be left on the film after the first abrader has passed over it will be removed by the next abrader or subsequent abraders.

Describing now in more detail Figs. 1, 2 and 3, the abraders are fixed at the outer ends of plungers $j^2$, $j^2$ which work in ribs $e^3$, $e^4$ projecting forwardly from the head $e$. On the inner ends of the plungers are screwed nuts $m$, $m$. Stiff springs $k$, $k$, abutting at their inner ends against the inner rib $e^3$ and at their outer ends against pins $l, l$, normally keep the underside of the abraders $j, j$ clear of the outer rib $e^4$. The tension of the springs $k, k$ is adjusted by means of the nuts $m, m$. The front end of each abrader is rounded off, as shown at $n$. The film-cutter, shown at $o$, Figs. 1 and 2, is fixed to the head $e$ by means of set-screws $o'$. The cutting or shearing edge of the cutter is preferably at right angles to the sides of the cutter and, as shown most clearly in Fig. 2, arranged eccentrically with respect to the periphery of the head $e$. The front side of the cutter works close up to the inner end of the cradle $b$ so that a shearing action is obtained as the cutter advances through the film. The periphery of the head $e$ projects beyond the abraders and thus serves as a guide to prevent the latter twisting out of place. $e^5$ is a cover-plate which incloses and protects the plungers, springs, etc.

In operation, the end of the film to be treated is placed on the cradle $b$, as in Figs. 3 and 5, between the cutter and that abrader which acts last after the cutting operation, and with one of its edges against the stop $f$. If necessary, it projects into a gap $e^6$ formed in the head $e$ whereby the end of the film is easily visible so that the amount to be cut therefrom can be readily ascertained. Rotary motion being imparted to the head $e$, the cutter cuts back the film to the required length. Further rotation of the head brings the abraders successively into engagement with the gelatin and removes it from the film. The front ends of the abraders being rounded off as at $n$ readily ride up on to the film and in so doing slightly compress the springs $k, k$. By reason of the curvature of the cradle being concentric with the axis of rotation of the spindle $e'$ a uniform pressure of the abraders on the film is insured and the gelatin is removed without damage to the film.

Dealing now with the modified details of the machine illustrated in Figs. 4 and 5, the cradle $b$ is fixed along one edge to the table $a'$ by suitable means, such as screws, of which one is shown at $b'$, Fig. 5, the remaining portion thereof being unsupported, thereby rendering the cradle resilient so that it is able to yield under the pressure of the abraders. A springy plate $h$, fixed by means of screws $h', h'$ to the table $a'$, is arranged to bear on the end of the film under treatment so as to keep it stationary and prevent it buckling or bending during treatment. Instead of the plate $h$, however, I may provide a vertically guided spring-controlled plate. Each abrader is loosely pivoted at one end, as at $j^3$, to an arm $j^4$ which is secured at $j^5$ to the head $e$. A spring $k$, abutting at one end against a fixed stop $l$, normally keeps the arm $j^4$ in contact with a fixed pin $l^*$.

Into the free end of each abrader a screw $j^6$ is screwed which is adapted to engage the free end of a resilient strip $n^*$, the other end of which is fixed to a stop $n'$ secured to the head $e$. The resilient mounting of the abraders insures a uniform removal of the gelatin from and prevents injury to the film. The position of the film-cutter $o$ is made adjustable on the head $e$ by means of a set-screw $o'$ passing through a slot $o^2$ formed in the cutter. The head $e$ carries brackets $p, p$ provided with forwardly projecting pins $p', p'$. These brackets serve as guides for the abraders, and their pins $p', p'$ act as stops to keep the free end of the abraders approximately in working position. When the abraders engage the near edge of the cradle they are to a slight extent forced inward against the pressure of the springs $k, k$. The cradle being secured along one edge only, namely, its farther edge, its near edge moves slightly downward due to the pressure of the springs $k, k$. Then, as the abraders continue to advance, the pressure between them and the cradle extends along them until they are completely over the cradle. During this movement, the free ends of the abraders press up against the free ends of the resilient strips $n^*$. Then the abraders advance across the film under a uniform pressure. By means of the screws $j^6$ the pressure of the resilient strips $n^*, n^*$ on the free ends of the abraders can be regulated.

If found necessary, each abrader may have a portion of its surface made smooth for the purpose of polishing the portion of the film from which the gelatin has been removed, or a polishing surface separate from the abraders may be provided. The abraders may be of any other suitable form than that described.

Instead of a rotary form of machine, as above described, I may, in accordance with this invention, mount an abrader, which may be pressed downward by means of a spring, on a slide which is moved to and fro in the base of the machine. The cradle is flat, it may be vertically and horizontally adjustable, and may be provided with a small projection adapted to enter one of the usual perforations found at the edges of films as already above described. On the side of the cradle toward which the abrader moves on its forward stroke I may arrange a fillet or projection standing up slightly above the film, so as to ease the passage of the abrader on to the film, and thereby prevent the abrader buckling, damaging or moving the film. This fillet or projection also serves to scrape off from the abrader any gelatin that may remain on it from the previous abrading operation before it reaches the film for the next abrading operation. If a rotary abrader, e. g., a milling cutter is used, it may be mounted on a spindle carried by the slide, which spindle carries a pinion gearing with a stationary rack, the arrangement being such that the act of reciprocating the slide causes the spindle and pinion, and consequently the milling cutter, to rotate. In some cases, in carrying out this invention, the slide may carry a knife, as shown in Fig. 6, for removing the gelatin, which is somewhat of L section, the vertical portion $q$ thereof being extended forward beyond the horizontal base portion $q'$ and having its lower edge sharpened at $q^2$. The horizontal base portion is sharpened at its front edge at $q^3$ which is sloped rearwardly. As the knife advances, the sharpened edge $q^2$ cuts across and through the gelatin and the sharpened edge $q^3$ removes the gelatin. Elongated holes $q^4$, $q^4$ are provided for adjustably fixing the knife to the slide.

This invention applies equally where the film is coated with material other than gelatin.

As an example of other abrading means which I may employ I may mention an emery wheel.

I claim:—

1. In a machine of the type referred to, means for cutting the film, means for removing the coated surface from the film, and a carrier for both of said means for causing them to operate successively on the film.

2. In a machine of the type referred to, means for holding the film, means for cutting the films, means for removing the coated surface from the film, a carrier for the two last mentioned means and means for operating the carrier to bring the cutting and removing means against the film.

3. In a machine of the type specified, means for holding the film, means for cutting the film, means for removing the coated surface from the film, and a common means for urging the said cutting means through and the said coated surface removing means across the film.

4. In a machine of the type referred to, means for holding the film, cutting means, abrading means, a carrier for said cutting and abrading means, said abrading means being provided with adjustable tension means, and means for operating the carrier.

5. In a machine of the type referred to, a cradle for receiving the film, means for holding the film in the cradle, cutting means, abrading means, a carrier for said cutting and abrading means, said abrading means being provided with adjustable spring tension means, and means for operating the carrier.

6. In a machine of the type specified, means for holding the film, cutting means, abrading means, a rotatable carrier for said cutting and abrading means, and means for rotating the carrier.

In witness whereof I have hereunto set my hand in the presence of two witnesses.

PERCIVAL E. STOW.

Witnesses:
H. T. P. GEE,
H. D. JAMESON.